United States Patent [19]
Ahn

[11] Patent Number: 6,141,214
[45] Date of Patent: Oct. 31, 2000

[54] COOLING APPARATUS FOR ELECTRONIC SYSTEMS AND COMPUTER SYSTEMS WITH SUCH APPARATUS

[75] Inventor: Tae-Bong Ahn, Seoul, Rep. of Korea

[73] Assignee: SamSung Electronics Co., Ltd., Suwon, Rep. of Korea

[21] Appl. No.: 09/164,345

[22] Filed: Oct. 1, 1998

[30] Foreign Application Priority Data

Oct. 20, 1997 [KR] Rep. of Korea ..................... 97-51053

[51] Int. Cl.[7] ............................. H05K 7/20; F28F 7/00; F28D 11/00
[52] U.S. Cl. ..................... 361/687; 361/688; 361/690; 361/692; 361/694; 361/695; 361/697; 361/703; 361/707; 361/710; 165/80.2; 165/80.3; 165/86; 165/185
[58] Field of Search ................................. 361/687, 688, 361/690, 692, 694, 695, 697, 703, 710, 707; 165/80.2, 80.3, 86, 185

[56] References Cited

U.S. PATENT DOCUMENTS

| | | |
|---|---|---|
| 5,596,483 | 1/1997 | Wyler ....................................... 361/683 |
| 5,694,294 | 12/1997 | Ohashi et al. ........................... 361/687 |
| 5,729,431 | 3/1998 | Marwah et al. . |
| 5,734,550 | 3/1998 | Penniman et al. . |
| 5,737,171 | 4/1998 | Buller et al. . |
| 5,740,013 | 4/1998 | Roesner et al. ......................... 361/697 |
| 5,796,580 | 8/1998 | Komatsu et al. . |
| 5,862,037 | 1/1999 | Behl ........................................ 361/687 |
| 5,963,424 | 10/1999 | Hileman et al. ........................ 361/695 |

*Primary Examiner*—Leo P. Picard
*Assistant Examiner*—Tung Minh Bui
*Attorney, Agent, or Firm*—Robert E. Bushnell, Esq.

[57] ABSTRACT

Cooling apparatus for electronic systems and a computer system with such apparatus is disclosed. The apparatus dissipates heat from circuit boards of such systems to the surroundings, thus effectively cooling the circuit boards. The cooling apparatus has a cooling unit, having a board seat defined in its bottom and side walls and seating a circuit board in the seat. A fan is exteriorly seated on the unit at a position opposite to the board seat. An air passage extends from the fan to the board seat, thus dissipating heat from the circuit board to the surroundings using air. Such a cooling unit is detachably set in the main body of a computer system with both a central processing board being seated in the board seat of the unit and a system board being set in the main body.

16 Claims, 5 Drawing Sheets

SEC A-A'

COOLING APPARATUS FOR ELECTRONIC SYSTEMS AND COMPUTER SYSTEMS WITH SUCH APPARATUS

CLAIM OF PRIORITY

This application makes reference to, incorporates the same herein, and claims all benefits accruing under 35 U.S.C §119 from an application entitled Cooling Apparatus For Electronic Systems Computers System With Such Apparatus earlier filed in the Korean Industrial Property Office on Oct. 2, 1997, and there duly assigned Serial No. 97-51053 by that Office.

FIELD OF THE INVENTION

The present invention relates, in general, to cooling apparatus for electronic systems, such as computers, and, more particularly, to cooling apparatus capable of dissipating heat from hot elements of electronic systems to the surroundings, thus effectively cooling such elements. The invention also relates to a computer system provided with such cooling apparatus.

BACKGROUND OF THE INVENTION

While designing integrated circuit boards for electronic systems, such as computers, most designers feel uneasy about the operation of the circuit boards which are apt to be badly effected by heat. That is, when the temperature around an integrated circuit board for electronic systems rises to a high point, the circuit board may be badly affected by heat and this causes the signal-up/down timing of the circuit board to be thermally changed from a designed timing. In such a case, the circuit board may malfunction. Particularly in the case of a digital circuit board for electronic systems, heat may change the designed signal-up/down timing of the circuit board and this prevents the circuit board from exactly sending or receiving signals.

Since CPUs (central processing units) for portable computers, such as laptop computers, notebook computers or palmtop computers, are highly integrated and miniaturized, it is necessary to design such CPUs so that they effectively dissipate heat to the surroundings during their operation.

Typical methods of dissipating heat from circuit boards for electronic systems to the surroundings are accomplished by indirect cooling apparatus, which are added to the systems and indirectly dissipate heat from the circuit boards to the surroundings. That is, heat sinks, heat pipes and/or motored fans are typically used for indirectly dissipating heat from circuit boards of electronic systems to the surroundings. Such heat sinks, heat pipes and motored fans are selectively installed in electronic systems to cooperate with each other for cooling the circuit boards of the systems. However, such an indirect cooling apparatus is problematic in that it may fail to effectively cool such circuit boards.

Examples of known cooling apparatus are: U.S. Pat. No. 5,796,580 to Toshihiro Komatsu et al., entitled Air-Cooled Information Processing Apparatus Having Cooling Air Fan, Sub-Fan, and Plural Separated Cooling Air Flow Channels; U.S. Pat. No. 5,740,013 to Arlen L. Roesner et al., entitled Electronic Device Enclosure Having Electromagnetic Energy Containment And Heat Removal Characteristics; U.S. Pat. No. 5,737,171 to Marvin Lawrence Buller et al., entitled Switched Management Of Thermal Impedence To Reduce Temperature Excursions; U.S. Pat. No. 5,734,550 to Mark B. Penniman et al., entitled Computer Having A Heat Transfer System Operably Connected During Assembly of a Computer Keyboard Upon The Computer; and U.S. Pat. No. 5,729,431 to Ramesh Marwah et al., entitled Heat Sink For A Portable Personal Computer.

SUMMARY OF THE INVENTION

Accordingly, the present invention has been made keeping in mind the above problems occurring in the prior art, and an object of the present invention is to provide cooling apparatus capable of effectively dissipating heat from circuit boards of electronic systems to the surroundings, thus effectively cooling such circuit boards.

Another object of the present invention is to provide a computer system provided with such cooling apparatus.

In order to accomplish the above objects, the present invention provides cooling apparatus for electronic systems having a circuit board generating heat, comprising: a cooling unit having an opening defined in its bottom and side walls, wherein the circuit board is seated in the opening, and the cooling unit also has both a fan exteriorly seated on the bottom wall at a position opposite the opening and an air passage extending from the fan to the opening, thus dissipating heat from the circuit board to surroundings using air.

In the preferred embodiment, the cooling unit comprises: a board seat interiorly formed in the opening and adapted for seating a circuit board; a fan seat exteriorly formed on the bottom wall of the unit and adapted for seating the fan; a first vent formed on a bottom wall of the fan seat to communicate with the board seat, thus guiding air from the atmosphere into the board seat; a second vent formed on a side wall of the unit at a position spaced apart from the first vent by a predetermined distance, the second vent communicating with the board seat, thus guiding air from the board seat into the atmosphere; and a plurality of heat dissipating fins exteriorly formed on the bottom wall of the unit at a position around the fan seat.

The present invention also provides a computer system with cooling apparatus, comprising: a main body; a display body electrically connected to the main body to display an operational process of the system; a cooling unit set in the main body and having a board seat, the unit being adapted for dissipating heat from the main body to surroundings; a fan provided on the cooling unit and adapted for forming a pressurized air circulation in the cooling unit, thus cooling the unit; a central processing board seated in the board seat of the cooling unit and having both a CPU module and a video module, the video module being adapted for controlling the display body; and a system board set in the main body, the system board having both a system bus and a power supply and cooperating with the central processing board to perform operational functions.

BRIEF DESCRIPTION OF THE DRAWINGS

A more complete appreciation of the present invention, and many of the attendant advantages thereof, will become readily apparent as the same becomes better understood by reference to the following detailed description when considered in conjunction with the accompanying drawings in which like reference symbols indicate the same or similar components, wherein.

DESCRIPTION OF THE PREFERRED EMBODIMENTS

Figure 1:
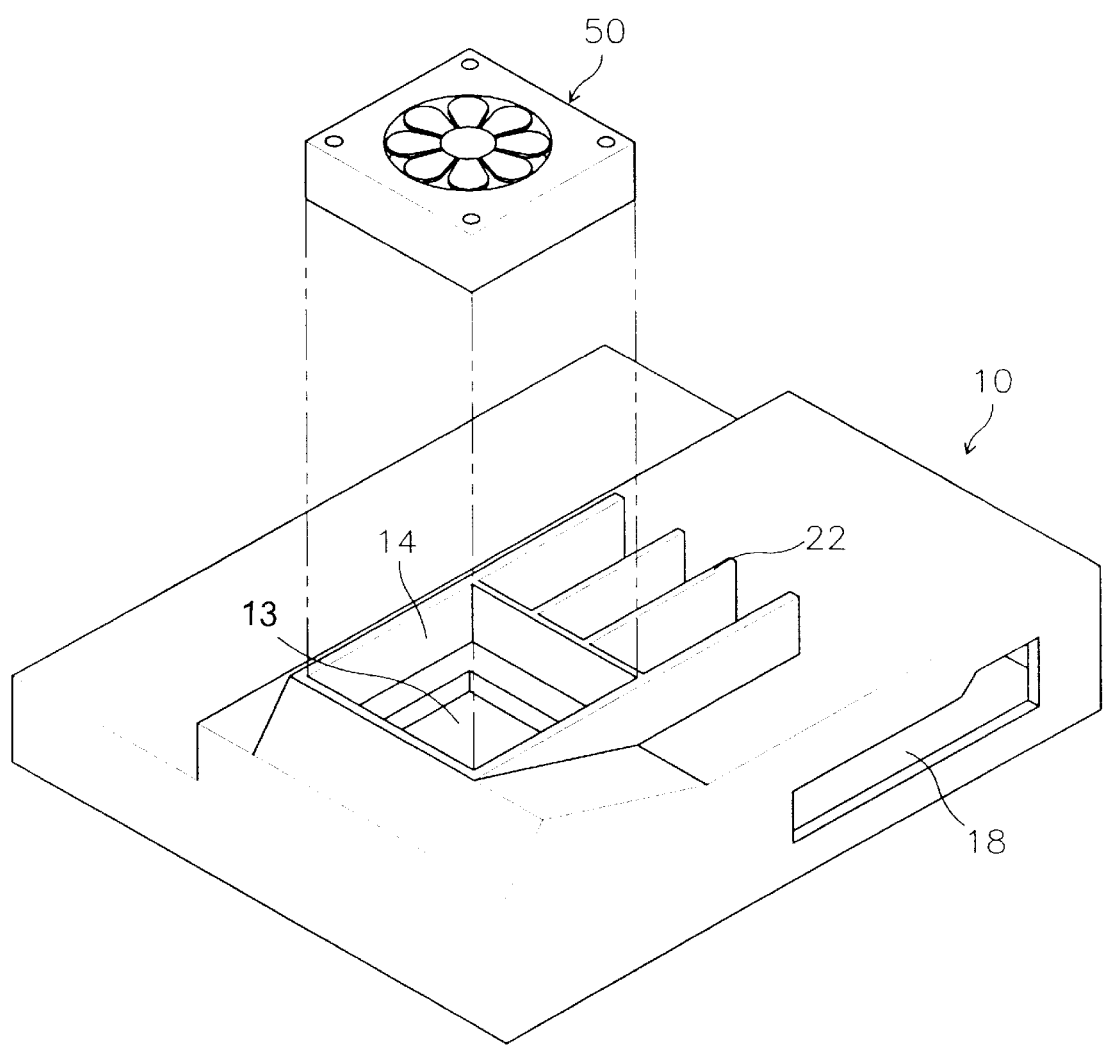
FIG. 1 is and exploded perspective top view showing a motored fan and a cooling unit of a cooling apparatus in accordance with the preferred embodiment of the present invention.

Shown in FIG. 1 is a top exploded perspective view of a cooling unit 10 and a motored fan 50 to be set in cooling unit 10. Cooling unit 10 is installed in an electronic system and holds at least one circuit board printed with a circuit for processing the operation of the electronic system. Cooling unit 10, having the motored fan 50, effectively dissipates heat from the circuit board to the surroundings, thus effectively cooling the circuit board. A pocket 13 is formed in an upper surface area of cooling unit 10. Pocket 13 includes a fan seat 14 dividing pocket 13 into two areas. Cooling fan 50 is inserted into the upper area of pocket 13 and is seated on fan seat 14. Cooling fan 50 draws air from an area outside of cooling unit 10 into a lower area of pocket 13. In the embodiment of this invention, a heat sink having heat dissipating fins 22 is preferably used as cooling unit 10. Heat dissipating fans 22 extend from one side of pocket 13 along a predetermined portion of the upper surface area of cooling unit 10, thus improving the heat dissipating effect of the unit 10. In the present invention, motored fan 50 may be fixed to fan seat 14 using conventional set screws or adhesive.

Figure 2:
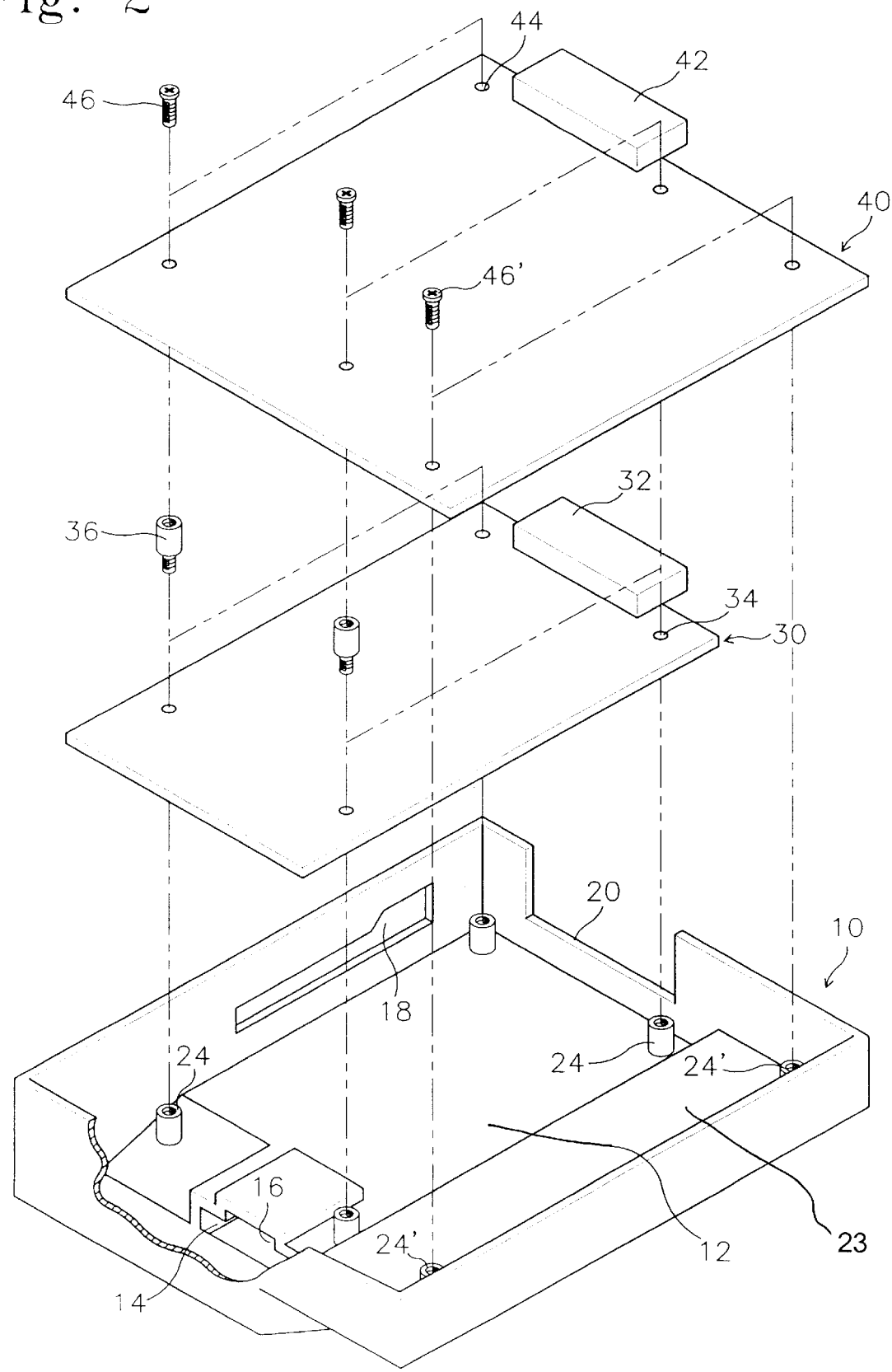
FIG. 2 is an exploded perspective bottom view showing two circuit boards to be installed on board seats of the cooling unit of FIG. 1.

Turning to FIG. 2, a first board seat 12 and second board seat 23 are interiorly formed on the inner surface of the upper surface area of cooling unit 10. First board seat 12 stably holds at least one circuit board in cooling unit 10. First board seat 12 and second board seat 23 together hold at least one circuit board in cooling unit 10. Cooling unit 10 also has two vents: a vent 16 and a vent 18 for allowing air to circulate through the inside area of cooling unit 10. Vent 16 is formed in one side wall of pocket 13 opposite heat dissipating fins 22 to allow air drawn into the lower area of pocket 13 by fan 50 to enter the interior area of cooling unit 10. The combination of the lower area of pocket 13 and vent 16 increases the air pressure of the air being forced into the interior of cooling unit 10. Vent is formed on a side wall of cooling unit 10 at a position spaced apart from vent 16 by a predetermined distance to permit the air drawn into the interior area of cooling unit 10 to be exhausted to the exterior of cooling unit 10 while cooling the circuit board and interior of cooling unit 10. Vent 16 forms an air intake passage guiding air into the area around the circuit boards on board seats 12 and 23 by the force of motored fan 50 while vent 18 forms an air exhaust passage through which the air from the interior of cooling unit 10 is exhausted.

In the present invention, a plurality of circuit boards may be installed in cooling unit 10. As shown in FIG. 2, a plurality of bosses 24 and 24' are formed on the board seat 12 and board seat 23, respectively, thus stably holding two or more circuit boards on board seats 12 and 23. A "boss" is defined as a spacer having a threaded core for receiving a bolt or a screw. Cooling unit 10 is preferably shaped to meet the configuration of the circuit boards seated on the board seats 12 and 23. Cooling unit 10, according to the embodiment of this invention, is designed for seating, for example, circuit boards 30 and 40, with board 30 being smaller than board 40. Boards 30 and 40 individually have a plurality of screw holes 34 and 44, respectively, at positions corresponding to bosses 24 and 24'. The two circuit boards 30 and 40 are thus stably seated on the board seats 12 and 23. In such a case, screws 36, i.e., boss headed screws or boss headed bolts, used for attaching the board 30 to bosses 24 of board seat 12, individually have a cylindrical and interiorly threaded head. After board 30 is attached to bosses 24 of board seat 12 using the above screws 36, board 40 is seated on board seats 12 and 23. That is, board 40, being larger than board 30, is primarily attached or bolted to the heads of the screws 36 using screws, or bolts, 46 at the screw holes 44 corresponding to the screws 36. In such a case, the heads of the screws 36 individually have a specific height, so that the heads of the screws 36 act as spacers capable of spacing boards 30 and 40 from each other while maintaining a parallelism between the two boards. Board 40 is also directly attached to the bosses 24' of board seat 23 using a plurality of screws 46' at a position outside the edge of the board 30.

In order to electrically connect circuit boards 30 and 40, seated on the board seats 12 and 23, to another circuit of the electronic system, connectors 32 and 42 are respectively provided on circuit boards 30 and 40 in the preferred embodiment. However, when circuit boards 30 and 40 are designed connected to each other, it is possible to form one connector 32 or 42 on either circuit board 30 or 40. In addition, a connector slot 20 is formed through a side wall of cooling unit 10, thus allowing connectors 32 and 42 to be seated in the side wall of the cooling unit 10.

Figure 3:
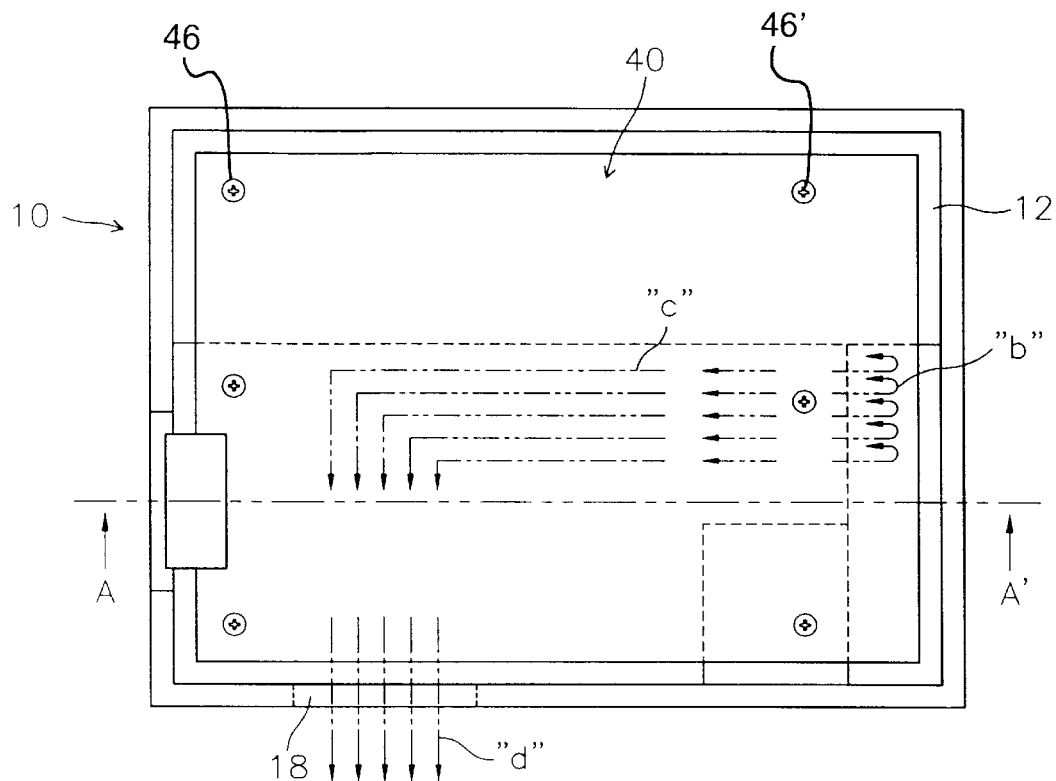
FIG. 3 is a plane view of the cooling apparatus of this invention, showing an air circulation formed around a circuit board by the motored fan.
Figure 4:
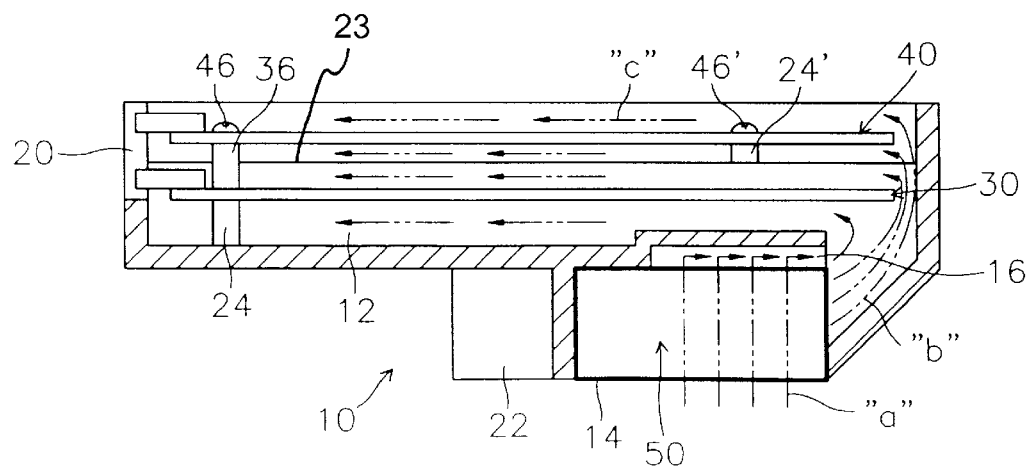
FIG. 4 is a sectional view of the cooling apparatus of this invention taken along the line A-A of FIG. 3, showing the air circulation formed on the circuit board by the motored fan.

FIG. 3 is a plane view of the cooling apparatus of this invention, showing an air circulation formed around circuit boards by the motored fan 50. FIG. 4 is a sectional view of the cooling apparatus of this invention taken along the line A—A of FIG. 3, showing the air circulation formed around the circuit boards by the motored fan 50.

As shown in the drawings, cooling air is pressurized and circulates in the cooling unit 10 by the suction, or drawing, force of fan 50. That is, fan 50 primarily draws air into the interior of cooling unit 10. In such a case, the air forcibly passes through vent 16 as shown by the arrow "a" of FIG. 4 prior to reaching the interior of cooling unit 10. The air from vent 16 is primarily introduced to circuit boards 30 and 40 as shown by the arrows "b" of FIGS. 3 and 4. Thereafter, the air flows between and is around circuit boards 30 and 40 as shown by the arrows "c" of FIGS. 3 and 4. The air is, thereafter, exhausted from cooling unit 10 through vent 18 as shown by the arrows "d" of FIG. 3.

Figure 5:
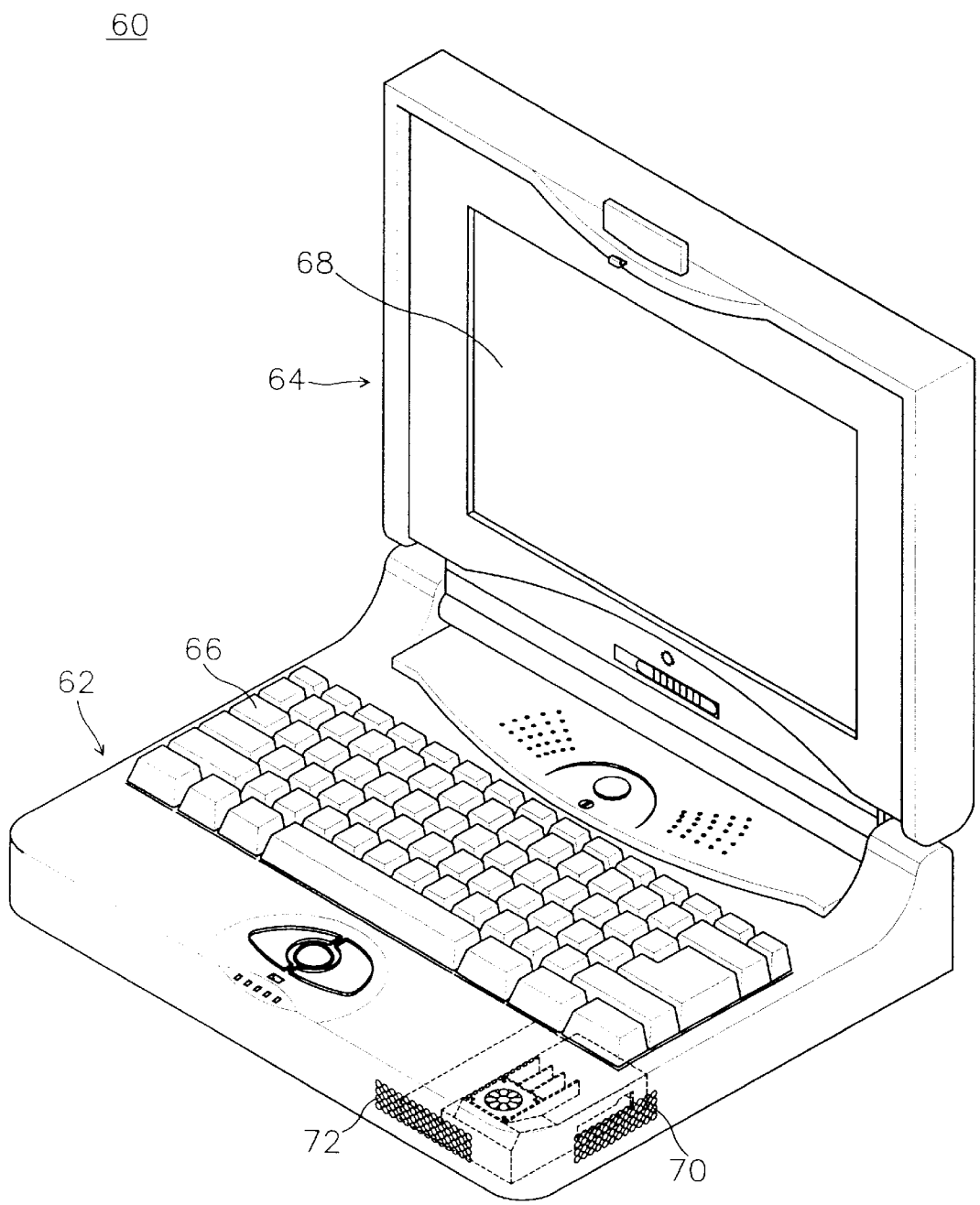
FIG. 5 is a perspective view of a portable computer provided with the cooling apparatus according to the present invention.

Of course, as shown in FIG. 5, the electronic system is provided with both a grille covered air inlet 72 guiding atmospheric air to fan 50 and a grille covered air outlet 70 guiding exhaust air from vent 18 of the unit 10 into the atmosphere.

The above cooling apparatus of this invention is effectively used with a portable computer, such as a laptop computer, a notebook computer or a palmtop computer. In accordance with the recent trend of lightness, thinness, compactness and smallness of such portable computers, the CPUs for such computers are highly integrated and miniaturized, so that it is necessary to equip such computers with cooling apparatus capable of effectively dissipating heat from the hot elements, including the CPUs, of the computers to the surroundings. Particularly, since such portable computers require a high memory capacity and process at high speeds in recent years, the CPUs for such computers are designed for processing at high speeds and this causes the CPUs to generate high temperature heat during the operation of the computers. Therefore, when existing CPUs of portable computers are changed with upgraded CPUs to improve the quality of the computers, existing cooling apparatus may fail to effectively cool the elements, including the upgraded CPUs, of the computers. Therefore, it may be necessary to change the existing cooling apparatus with large capacity apparatus when upgrading portable computers. However, the cooling apparatus of this invention effectively eliminates such problems expected when upgrading the portable computers, so that the cooling apparatus of this invention allows users to upgrade their portable computers without worrying about such problems.

Figure 6:
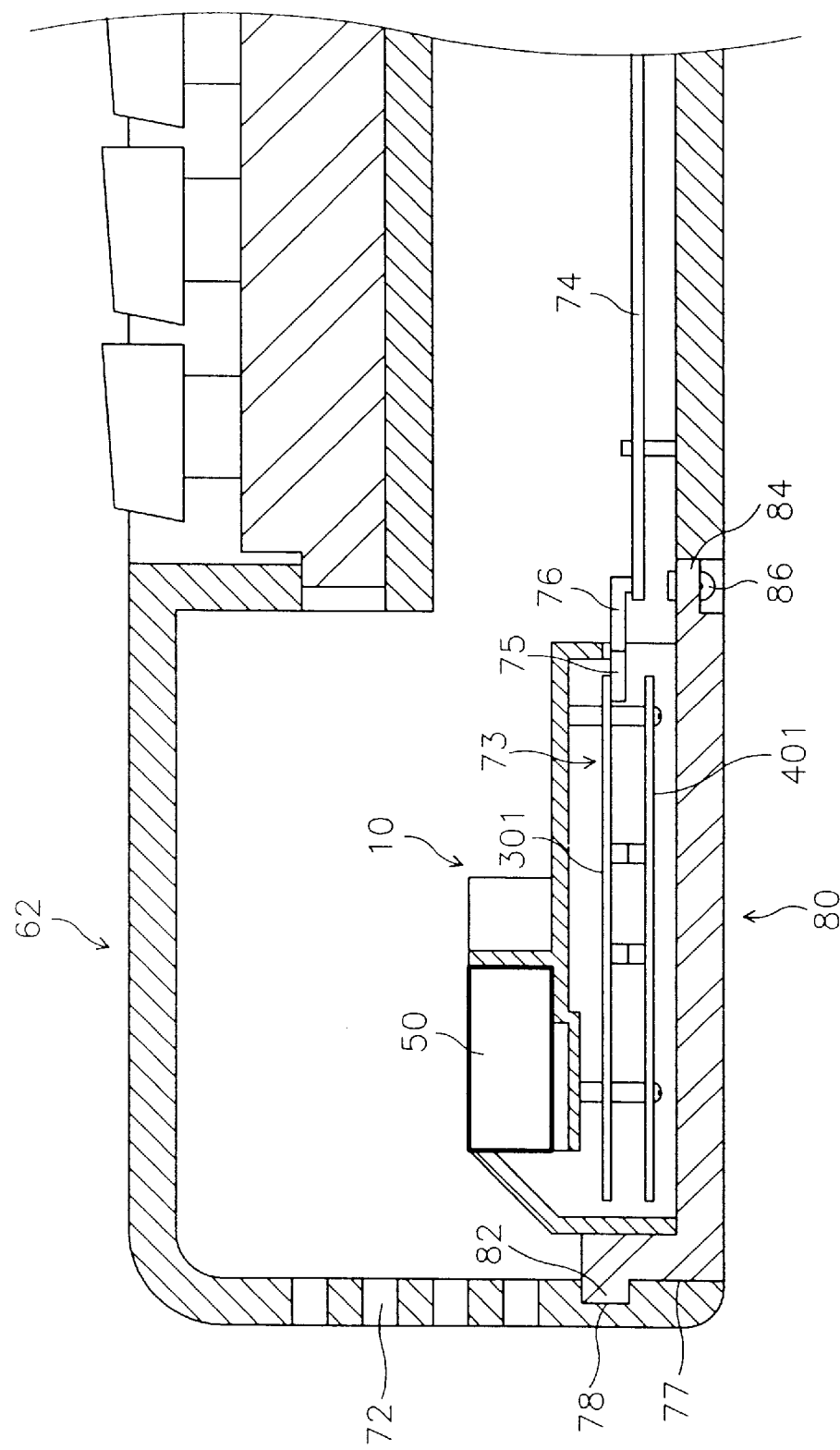
FIG. 6 is a sectional view of the portable computer of FIG. 5, showing the cooling apparatus installed in the computer.

As shown in the FIGS. 5 and 6, a portable computer 60 comprises a main body 62 and a display body 64. Main body 62 is provided with a main board in the same manner as that of conventional computer systems. Display body 64, hinged to the rear edge of main body 62, is electrically connected to the main board of main body 62, thus displaying the operational process of the main board on a display panel 68. In portable computer 60, a keyboard 66 is arrayed on the top surface of main body 62, which is different from conventional desktop computers. A flat display panel 68 is set on the interior wall of display body 64, thus displaying the operational process of the main board thereon. Since display body 64 is hinged to the rear edge of main body 62, display body 64, in its closed position, covers and protects main body 62. When the main body 62 is closed by the display body 64, the display panel 68 is opposed to the keyboard 66.

The cooling apparatus of this invention is set in main body 62 of portable computer 60. In such a case, a circuit boards as shown in FIG. 6, set in cooling unit 10, is a central processing board 73 including both a CPU module 301 and a video module 401. The above video module 401 is for controlling display panel 68 of display body 64. In the above central processing board 73, the CPU module 301, formed by integrating a CPU, a main chip set and other integrated circuits into a single module, is preferably used for effectively managing the operation of the high speed CPU in portable computer 60. An example of such a CPU module 301 is a Pentium II processor, manufactured and marketed by the Intel Corp. of U.S.A.

Main body 62 has a system board 74, which has both a system bus (not shown) and a power supply (not shown) and cooperates with central processing board 73 to perform operational functions. Boards 73 and 74 are electrically connected to each other at their connectors 75 and 76. Connector 75 of central processing board 73 is connected to connector 76 of system board 74 via connector slot 20 which is formed through a side wall of cooling unit 10.

With reference to FIG. 6, in order to prevent the cooling apparatus of this invention from being unexpectedly moved or separated from main body 62 due to external shock, a mounting hole 77 for the cooling apparatus is disposed in the bottom of main body 62 at a position where the cooling apparatus is installed. In order to set the cooling apparatus of this invention in computer 60, the cooling unit 10 is primarily received into main body 62 of computer 60 through mounting hole 77 while electrically connecting central processing board 73 of cooling unit 10 to system board 74 of main body 62. Thereafter, a service plate 80 having a hooking rail 82 slidably engages a hooking groove 78 formed in any interior surface of a front wall of main body 62 below inlet 72. Then service plate 80 is set in mounting hole 77. The cooling apparatus is thus stably set in main body 62 of computer 60. Service plate 80 preferably has a recessed mounting edge 84 where service plate 80 is attached to the bottom of main body 62 using a plurality of screws, or bolts, 86. In such a case, due to the recessed edge 84, the heads of screws 86 are not projected from the bottom surface of the main body 62.

The above-mentioned structure for mounting the cooling apparatus of this invention in a portable computer is advantageous as follows. That is, the above structure allows central processing board 73, set in cooling unit 10, to be freely removed from main body 62 of computer 60 when necessary. Therefore, system board 74 may be designed for forming a fixed electronic circuit of a computer system, while the central processing board 73 may be designed for being changeable with another one when it is necessary to upgrade the computer system. In such a case, it is very easy for users to upgrade computer systems.

As described above, the present invention provides cooling apparatus capable of concentrically dissipating heat from hot elements, such as circuit boards, of electronic systems to the surroundings, thus effectively cooling such hot elements. Particularly in the case of compact electronic systems, such as portable computers with highly integrated and miniaturized circuits, the cooling apparatus of this invention effectively cools the hot elements of the systems irrespective of a limited area for the cooling apparatus. Another advantage of the invention resides in that the cooling apparatus is effectively used for cooling module elements, such as central processing boards.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A cooling apparatus for an electronic system having at least one circuit board generating heat, the cooling apparatus comprising:

a cooling fan; and an integral cooling unit having an interior and exterior, said cooling unit comprising:

board seating means for seating said at least one circuit board in said interior of said cooling unit;

a pocket formed in an upper exterior surface area of said cooling unit, said pocket having fan seating means for seating said cooling fan in said pocket, and a first vent in one side wall of said pocket communicating with said interior of said cooling unit; and a second vent in one side wall of said cooling unit, said cooling fan drawing air from said exterior to said interior through said first vent, past said at least one circuit board, and exhausting said air through said second vent for cooling said circuit board.

2. The cooling apparatus as set forth in claim 1, said cooling unit further comprising:

a plurality of heat dissipating fins extending from another side wall of said pocket along said upper exterior surface area of said cooling unit.

3. The cooling apparatus as set forth and claim 1, said board seating means comprising:

a first board seat;

a second board seat;

a first plurality of bosses mounted on said first board seat for receiving a first circuit board and a first plurality of boss headed fasteners for securing said first circuit board to said first plurality of bosses, wherein said first circuit board is spaced below and parallel to said first board seat;

a second plurality of bosses mounted on said second board seat for receiving a second circuit board, said second circuit board being secured to said plurality of boss headed fasteners and said second plurality of bosses by a third plurality of fasteners, wherein said second circuit board is spaced below and parallel to said first circuit board and said second board seat.

4. The cooling apparatus as set forth in claim 1, said cooling unit further comprising a connector slot through which said at least one circuit board is connected to other components of said electronic system exterior to said cooling apparatus.

5. The cooling apparatus as set forth in claim 1, wherein said fan seating means divides said pocket into two areas, an upper area and a lower area, said cooling fan being disposed in said upper area and said first vent being disposed in said lower area.

6. The cooling apparatus as set forth in claim 3, said cooling unit further comprising a connector slot through which said first and second circuit boards are connected to other components of said electronic system exterior to said cooling apparatus.

7. The cooling apparatus as set forth in claim 3, said cooling unit further comprising: a plurality of heat dissipating fins extending from another side wall of said pocket along said upper exterior surface area of said cooling unit.

8. The cooling apparatus and set forth in claim 3, wherein said first circuit board comprises a central processing unit module for managing operations of said electronic system, and said second circuit board comprises a video module for controlling a display panel of said electronic system, said electronic system comprising a notebook computer.

9. The cooling apparatus is set forth and claim 5, wherein said cooling fan is attached to said fan seating means by an adhesive.

10. The cooling apparatus is set forth and claim 5, wherein said cooling fan is attached to said fan seating means by a mechanical fastener.

11. The cooling apparatus as set forth in claim 8, said cooling unit further comprising:
a plurality of heat dissipating fins extending from another side wall of said pocket along said upper exterior surface area of said cooling unit.

12. The cooling apparatus as set forth in claim 11, wherein said cooling unit comprises a heat sink.

13. A computer system with cooling apparatus, comprising:
a main body;
a display body electrically connected to said main body to display an operational process of said system;
a cooling unit set in said main body and having a board seat, said unit being adapted for dissipating heat from the main body to surroundings;
a fan provided on said cooling unit and adapted for forming a pressurized air circulation in said cooling unit, thus cooling the unit;
a central processing board seated in said board seat of the cooling unit and having both a central processing unit module and a video module, said video module being adapted for controlling said display body; and
a system board set in said main body, said system board having both a system bus and a power supply and cooperating with said central processing board to perform operational functions.

14. The computer system according to claim 13, wherein said cooling unit comprises:
a fan seat exteriorly formed on said unit at a position opposite to said board seat and adapted for seating said fan;
a first vent hole formed on a bottom wall of said fan seat to communicate with said board seat, thus guiding air from the outside of said unit into said board seat;
a connector slot formed on a side wall of said unit and adapted for receiving a connector, said connector being used for electrically connecting said central processing board to said system board; and
a second vent hole formed on a side wall of said unit at a position spaced apart from said first vent hole by a predetermined distance, said second vent hole communicating with said board seat, thus guiding air from said board seat to the outside of said unit.

15. The computer system according to claim 13, wherein said main body comprises:
a mounting hole formed on a bottom wall of said main body at a position around said cooling unit; and
a service plate set in said mounting hole to hold the cooling unit in said mounting hole.

16. The computer system according to claim 14, wherein said main body comprises:
a first grille formed on a side wall of said main body at a position corresponding to said second vent hole of the cooling unit; and
a second grille formed on a side wall of said main body at a position corresponding to said fan seat of the cooling unit.

* * * * *